(12) United States Patent
Lv

(10) Patent No.: US 9,729,456 B2
(45) Date of Patent: Aug. 8, 2017

(54) SERVICE DATA TRANSMISSION PROCESSING METHOD AND DEVICE AND COMMUNICATION SYSTEM

(71) Applicant: Huawei Technologies Co., Ltd., Shenzhen (CN)

(72) Inventor: Xinyan Lv, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 475 days.

(21) Appl. No.: 14/252,575

(22) Filed: Apr. 14, 2014

(65) Prior Publication Data

US 2014/0226482 A1 Aug. 14, 2014

Related U.S. Application Data

(63) Continuation of application No. PCT/CN2011/080799, filed on Oct. 14, 2011.

(51) Int. Cl.
*H04W 28/08* (2009.01)
*H04L 12/851* (2013.01)
(Continued)

(52) U.S. Cl.
CPC .............. *H04L 47/24* (2013.01); *H04W 4/00* (2013.01); *H04W 4/18* (2013.01); *H04W 8/082* (2013.01); *H04W 28/08* (2013.01)

(58) Field of Classification Search
None
See application file for complete search history.

(56) References Cited

U.S. PATENT DOCUMENTS

2009/0310582 A1 12/2009 Beser
2011/0116499 A1* 5/2011 Lim ........................ H04L 45/22
370/355
(Continued)

FOREIGN PATENT DOCUMENTS

CN 101448248 A 6/2009
CN 101453761 A 6/2009
(Continued)

OTHER PUBLICATIONS

Chinese International Search Report, Application No. PCT/CN2011/080799, Jul. 19, 2012, 18 pages.

Primary Examiner — Anh-Vu Ly
Assistant Examiner — Hector Reyes Ortiz
(74) Attorney, Agent, or Firm — Slater Matsil, LLP

(57) ABSTRACT

The present invention provides a service data transmission processing method and device and a communication system. The service data transmission processing method includes: receiving, by a service offloading apparatus, uplink service data sent by a user equipment; obtaining, by the service offloading apparatus, a service type of the uplink service data; and sending, by the service offloading apparatus, uplink service data, a service type of which is a core network service to a core network service proxy apparatus through a first service tunnel, or sending, by the service offloading apparatus, uplink service data, a service type of which is a non-core network service to a non-core network service proxy apparatus through a second service tunnel. The technical solutions can avoid excessive use of backhaul network resources of a core network by non-core network services.

18 Claims, 6 Drawing Sheets

(51) Int. Cl.
*H04W 4/18* (2009.01)
*H04W 8/08* (2009.01)
*H04W 4/00* (2009.01)

(56) References Cited

U.S. PATENT DOCUMENTS

| | | | |
|---|---|---|---|
| 2011/0235595 A1* | 9/2011 | Mehta | H04W 8/082 370/329 |
| 2011/0317560 A1 | 12/2011 | Aramoto et al. | |
| 2012/0076120 A1* | 3/2012 | Kovvali | H04W 76/021 370/338 |
| 2012/0188895 A1* | 7/2012 | Punz | H04W 76/022 370/252 |
| 2013/0051348 A1 | 2/2013 | Zhao et al. | |
| 2013/0258963 A1* | 10/2013 | Mihaly | H04L 12/4633 370/329 |

FOREIGN PATENT DOCUMENTS

| | | |
|---|---|---|
| CN | 101854663 A | 10/2010 |
| CN | 102056112 A | 5/2011 |
| WO | 2010079715 A1 | 7/2010 |

* cited by examiner

SERVICE DATA TRANSMISSION PROCESSING METHOD AND DEVICE AND COMMUNICATION SYSTEM

This application is a continuation of International Application No. PCT/CN2011/080799, filed on Oct. 14, 2011, which is hereby incorporated by reference in its entirety.

TECHNICAL FIELD

Embodiments of the present invention relate to the field of communications technologies, and in particular, to a service data transmission processing method and device and a communication system.

BACKGROUND

A mobile communication network includes a core network and an access network. In an existing long term evolution (LTE) system, when a mobile terminal accesses the Internet, service data needs to be accessed through an evolved NodeB (eNB), a serving gateway (S-GW), a PDN gateway (P-GW), and an SGi interface. If the Internet or Intranet can be conveniently and inexpensively accessed in the backhaul from the eNB to a core network, the SGi interface may be moved down to an edge of an access network or to the access network. Specifically, as shown in FIG. 1, a local gateway (L-GW) is set in a network to perform a traffic offload service, so as to forward core network services to the core network (CN) and forward Internet services to the Internet network. The embodiment shown in FIG. 1 is a single-access point (APN) technology, where various services uniformly converge at the L-GW. A multi-APN technology also exists, where core network services may be connected to the core network through the S-GW.

The L-GW in the prior art is an independent logical entity, and for a single-APN network architecture, when the L-GW is set at a position close to the core network, the problem of excessive use of backhaul network resources by non-core network services similar to the Internet services may be caused. The backhaul network resources herein are network resources between the eNB and the core network.

SUMMARY OF THE INVENTION

Embodiments of the present invention provide a service data transmission processing method and device and a communication system, which can avoid excessive use of backhaul network resources of a core network by non-core network services.

In one aspect, the present invention provides a service data transmission processing method, which includes receiving, by a service offloading apparatus, uplink service data sent by a user equipment. A service type of the uplink service data is obtained by the service offloading apparatus. The method further includes determining whether the service type of the uplink service data obtained by the service offloading apparatus is a core network service or a non-core network service. If the service type of the uplink service data obtained by the service offloading apparatus is a core network service, sending, by the service offloading apparatus, the uplink service data to a core network service proxy apparatus through a first service tunnel. If the service type of the uplink service data obtained by the service offloading apparatus is a non-core network service, sending, by the service offloading apparatus, the uplink service data to a non-core network service proxy apparatus through a second service tunnel.

In one aspect, the present invention provides another service data transmission processing method, which includes assigning, by a core network service proxy apparatus, an IP address to a user equipment and establishing, for the user equipment, a first service tunnel between the core network service proxy apparatus and a service offloading apparatus. The method further includes receiving, by the core network service proxy apparatus, uplink service data, which is sent by the service offloading apparatus through the first service tunnel. A service type of the uplink service data is a core network service. When an IP address of the user equipment carried in the uplink service data is inconsistent with the IP address locally assigned by the core network service proxy apparatus to the user equipment, the IP address of the user equipment carried in the uplink service data is replaced by the core network service proxy apparatus with the IP address locally assigned by the core network service proxy apparatus to the user equipment. The uplink service data is sent by the core network service proxy apparatus to a gateway device or an application server of a core network.

In one aspect, the present invention provides still another service data transmission processing method, which includes assigning, by a non-core network service proxy apparatus, an IP address to a user equipment and establishing, for the user equipment, a second service tunnel between the non-core network service proxy apparatus and a service offloading apparatus. The uplink service data sent by the service offloading apparatus through the second service tunnel is received by the non-core network service proxy apparatus. A service type of the uplink service data is a non-core network service. When an IP address of the user equipment carried in the uplink service data is inconsistent with the IP address locally assigned by the non-core network service proxy apparatus to the user equipment, the IP address of the user equipment carried in the uplink service data is replaced by the non-core network service proxy apparatus with the IP address locally assigned by the non-core network service proxy apparatus to the user equipment. The uplink service data is sent by the non-core network service proxy apparatus to an application server of a non-core network.

In another aspect, the present invention provides a service offloading apparatus, which includes a first receiver configured to receive uplink service data sent by a user equipment and obtain a service type of the uplink service data. A first sender is configured to send uplink service data to a core network service proxy apparatus through a first service tunnel. A service type of the uplink service data is a core network service. Alternatively, the first sender is configured to send uplink service data to a non-core network service proxy apparatus through a second service tunnel. A service type of the uplink service data is a non-core network service.

In still another aspect, the present invention provides a core network service proxy apparatus, which includes a first processor, a second receiver and a second sender, where the first processor is configured to assign an IP address to a user equipment and establish, for the user equipment, a first service tunnel between the core network service proxy apparatus and a service offloading apparatus. The second receiver is configured to receive uplink service data, which is sent by the service offloading apparatus through the first service tunnel and a service type of the uplink service data is a core network service. The first processor is further configured to replace the IP address of the user equipment carried in the uplink service data with the IP address assigned by the first processor to the user equipment when an IP address of the user equipment carried in the uplink service data is inconsistent with the IP address assigned by the first processor to the user equipment. The second sender is configured to send the uplink service data to a gateway device or an application server of a core network.

In yet another aspect, the present invention provides a non-core network service proxy apparatus, which includes a second processor, a third receiver and a third sender. The second processor is configured to assign an IP address to a user equipment and establish, for the user equipment, a second service tunnel between the non-core network service proxy apparatus and a service offloading apparatus. The third receiver is configured to receive uplink service data, which is sent by the service offloading apparatus through the second service tunnel and a service type of which is a non-core network service. The second processor is further configured to replace the IP address of the user equipment carried in the uplink service data with the IP address assigned by the second processor to the user equipment when an IP address of the user equipment carried in the uplink service data is inconsistent with the IP address assigned by the second processor to the user equipment. The third sender is configured to send the uplink service data to an application server of a non-core network.

In further another aspect, the present invention provides a communication system, which includes a service offloading apparatus and at least one of a core network service proxy apparatus and a non-core network service proxy apparatus. The service offloading apparatus is configured to receive uplink service data sent by a user equipment and obtain a service type of the uplink service data, and is configured to send uplink service data, a service type of which is a core network service, to the core network service proxy apparatus through a first service tunnel or send uplink service data, a service type of which is a non-core network service, to the non-core network service proxy apparatus through a second service tunnel.

In the above technical solutions, the service offloading apparatus and the service proxy apparatus may be separately disposed, and may both be served as a part of a local gateway. A service tunnel may be established between the service offloading apparatus and the service proxy apparatus. The service offloading apparatus distinguishes a service flow of a core network service from a service flow of a non-core network service, and provides, through different service tunnels, the service flows to the core network service proxy apparatus and the non-core network service proxy apparatus for processing, respectively, thereby avoiding excessive use of backhaul network resources of a core network by non-core network services and saving the backhaul network resources.

BRIEF DESCRIPTION OF THE DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

Figure 1:
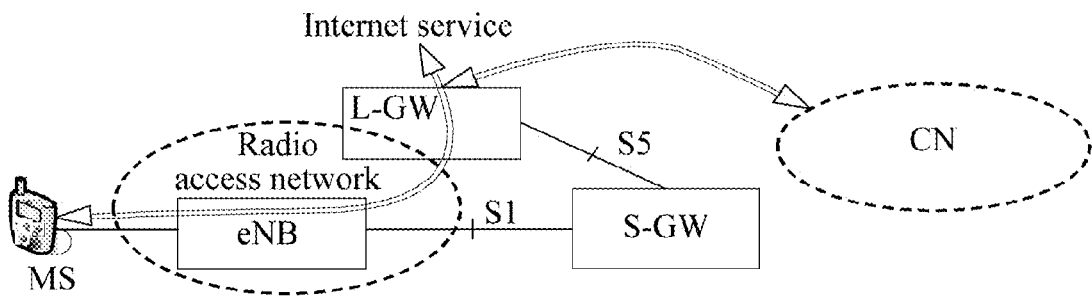
FIG. 1 is a schematic diagram illustrating setting of a local gateway in the prior art.
Figure 2:
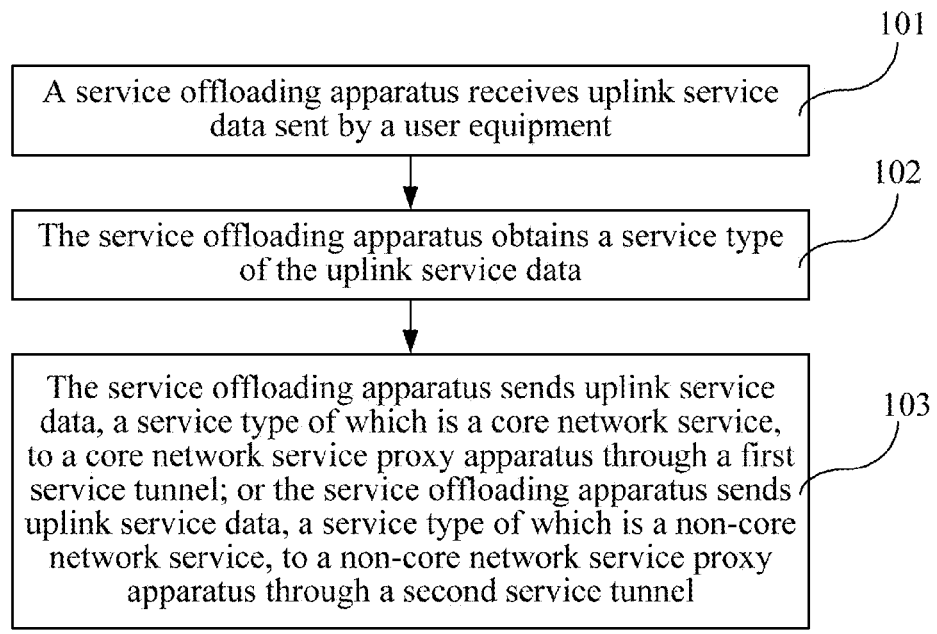
FIG. 2 is a schematic flow chart of a service data transmission processing method in an embodiment of the present invention.

An embodiment of the present invention provides a service data transmission processing method. A service offloading apparatus and a service proxy apparatus in this technical solution may form a local gateway, or may perform some functions of the local gateway separately, where the service proxy apparatus may be divided into a core network service proxy apparatus and a non-core network service proxy apparatus by type. FIG. 2 is a schematic flow chart of a service data transmission processing method in an embodiment of the present invention. As shown in FIG. 2, the method includes the following steps.

Step 101: A service offloading apparatus receives uplink service data sent by a user equipment.

Step 102: The service offloading apparatus obtains a service type of the uplink service data.

Step 103: The service offloading apparatus sends uplink service data, a service type of which is a core network service, to a core network service proxy apparatus through a first service tunnel; or the service offloading apparatus sends uplink service data, a service type of which is a non-core network service, to a non-core network service proxy apparatus through a second service tunnel.

In the above embodiment of the present invention, a service offloading apparatus and a service proxy apparatus are separately provided as two parts of a local gateway, where the service proxy apparatus may further be divided into a core network service proxy apparatus and a non-core network service proxy apparatus, which facilitates arrangement of the position of the service proxy apparatus according to an actual requirement. Besides, when a non-core network service is performed, the service flow of the non-core network service is identified in the service offloading apparatus, and is directly sent to the corresponding non-core network service proxy apparatus, thereby avoiding excessive use of backhaul network resources of a core network by non-core network services and saving the backhaul network resources.

In the embodiment of the present invention, the non-core network services may further include external Internet services and local network interactive services, where the external Internet services may be ordinary Internet services and the local network interactive services may be local area network services in an enterprise, a school or home. For the external Internet services, the corresponding non-core network service proxy apparatus is a traffic offloading proxy apparatus, and for the local network interactive services, the non-core network service proxy apparatus is a local IP address access proxy apparatus.

By providing different service proxy apparatuses to different services for corresponding processing, this embodiment can provide a more specific service for different types of services.

In the specific implementation of the present invention, before uplink service data transmission shown in FIG. 2 is implemented, a process of determining an IP address for the user equipment and establishing, for the user equipment, a service tunnel for transmitting uplink and downlink service data may further be included, and a core network service and a non-core network service are used as examples for illustration in the following.

Optionally, for a core network service, before step 101, the method may further include requesting, by the service offloading apparatus, the core network service proxy apparatus to assign an IP address to the user equipment when the service offloading apparatus obtains a first instruction from an S-GW. The first instruction is used for requesting assignment of the IP address to the user equipment and/or establishment of a first service tunnel between the service offloading apparatus and the core network service proxy apparatus for the user equipment. The method may include receiving, by the service offloading apparatus, the IP address which is sent by the core network service proxy apparatus and is assigned to the user equipment.

Specifically, for example, to determine the IP and establish the service tunnel for transmitting uplink and downlink service data for the user equipment, the S-GW may send the first instruction to the service offloading apparatus. After receiving the first instruction, the service offloading apparatus requests the core network service proxy apparatus to assign the IP address to the user equipment, so that the core network service proxy apparatus assigns the IP address to the user equipment after receiving the request. In a specific implementation process, a trigger mechanism may be set for the core network service proxy apparatus, so that the core network service proxy apparatus may automatically trigger the establishment of the first service tunnel between the core network service proxy apparatus and the service offloading apparatus for the user equipment each time after assigning the IP address to the user equipment.

In addition, the action of establishing the first service tunnel may also be triggered by the request sent by the service offloading apparatus. That is, before the receiving, by the service offloading apparatus, the IP address which is sent by the core network service proxy apparatus and is assigned to the user equipment, the method further includes the step of: requesting, by the service offloading apparatus, the core network service proxy apparatus to establish, for the user equipment, the first service tunnel between the service offloading apparatus and the core network service proxy apparatus.

The requests sent by the service offloading apparatus to the core network service proxy apparatus for assigning the IP address to the user equipment and for establishing the first service tunnel may be implemented through two different request messages, or may be implemented through one request message. For example, the service offloading apparatus requests the core network service proxy apparatus to assign the IP address to the user equipment and/or to establish, for the user equipment, the first service tunnel between the service offloading apparatus and the core network service proxy apparatus by sending a first create session request message to the core network service proxy apparatus.

Optionally, for a non-core network service, this embodiment may further include the step of determining an IP address and establishing a service tunnel for transmitting uplink and downlink service data for the user equipment. That is, before step 101, the method further includes requesting, by the service offloading apparatus, the non-core network service proxy apparatus to assign an IP address to the user equipment when the service offloading apparatus obtains a second instruction from the S-GW. The second instruction is used for requesting assignment of the IP address to the user equipment and/or establishment of a second service tunnel between the service offloading apparatus and the non-core network service proxy apparatus for the user equipment. The method may further include receiving, by the service offloading apparatus, the IP address which is sent by the non-core network service proxy apparatus and is assigned to the user equipment.

Specifically, for example, to determine the IP and establish the service tunnel for transmitting uplink and downlink service data for the user equipment, the S-GW may send the second instruction to the service offloading apparatus. After receiving the second instruction, the service offloading apparatus requests the non-core network service proxy apparatus to assign the IP address to the user equipment, so that the non-core network service proxy apparatus assigns the IP address to the user equipment after receiving the request. In a specific implementation process, a trigger mechanism may be set for the non-core network service proxy apparatus, so that the non-core network service proxy apparatus may automatically trigger the establishment of the second service tunnel between the non-core network service proxy apparatus and the service offloading apparatus for the user equipment each time after assigning the IP address to the user equipment.

In addition, the action of establishing the second service tunnel may also be triggered by the request sent by the service offloading apparatus. That is, before the receiving, by the service offloading apparatus, the IP address which is sent by the non-core network service proxy apparatus and is assigned to the user equipment, the method further includes the step of: requesting, by the service offloading apparatus, the non-core network service proxy apparatus to establish, for the user equipment, the second service tunnel between the service offloading apparatus and the non-core network service proxy apparatus.

The requests sent by the service offloading apparatus to the non-core network service proxy apparatus for assigning the IP address to the user equipment and for establishing the second service tunnel may be implemented through two different request messages, or may be implemented through one request message. That is, the service offloading apparatus requests the non-core network service proxy apparatus to assign the IP address to the user equipment and/or to establish, for the user equipment, the second service tunnel between the service offloading apparatus and the non-core network service proxy apparatus by sending a second create session request message to the non-core network service proxy apparatus.

In the above embodiment of the present invention, the first instruction and the second instruction sent by the S-GW to the service offloading apparatus may also be implemented by sending one message or implemented by sending two different messages, and details are not described herein again.

In the above embodiment, the service offloading apparatus may receive more than one IP address assigned to the user equipment. For example, the service offloading apparatus may request one or more core network service proxy apparatuses to assign IP addresses to the user equipment and request one or more non-core network service proxy apparatuses to assign IP addresses to the user equipment, and then the service offloading apparatus may select an IP address from the received IP addresses. For example, the method further includes: selecting, by the service offloading apparatus, an IP address from more than one received IP address assigned to the user equipment as an IP address of the user equipment. Optionally, if an IP address, which is sent by the core network service proxy apparatus and is assigned to the user equipment, exists in more than one IP address which is assigned to the user equipment and is received by the service offloading apparatus, the service offloading apparatus selects the IP address, which is sent by the core network service proxy apparatus and is assigned to the user equipment, as the IP address of the user equipment. When there are multiple IP addresses which are sent by the core network service proxy apparatus and are assigned to the user equipment, the service offloading apparatus may select an IP address randomly or according to a preset rule.

After the service offloading apparatus selects the IP address of the user equipment from the more than one received IP address assigned to the user equipment, the method further includes: sending, by the service offloading apparatus, the IP address of the user equipment to the user equipment.

The sending, by the service offloading apparatus, the IP address to the user equipment may specifically be: first sending, by the service offloading apparatus, the IP address of the user equipment to an eNB, and sending, by the eNB, the IP address of the user equipment to the user equipment. When the service offloading apparatus sends the IP address of the user equipment to the eNB, the service offloading apparatus may directly send the IP address of the user equipment to the eNB, or the service offloading apparatus may send the IP address of the user equipment to the eNB through an S-GW and an MME. That is, the service offloading apparatus first sends the IP address of the user equipment to the S-GW, the S-GW sends the IP address of the user equipment to the MME, and the mobility entity sends the IP address of the user equipment to the eNB. The technical solution of directly sending the IP address of the user equipment to the eNB by the service offloading apparatus is easy to implement, and the technical solution of forwarding the IP address of the user equipment through the S-GW and the MME is highly compatible with the prior art. An example of the mobility entity in the embodiments of the invention is a mobility management entity (MME).

For example, in the above embodiment, when the MME sends the IP address of the user equipment to the eNB, the MME may send the IP address of the user equipment to the eNB by carrying it in a bearer setup request message sent by the MME. Further, an IP address of the service offloading apparatus may further be carried in the bearer setup request message. The IP address of the service offloading apparatus may be obtained by the service offloading apparatus during initialization of a system, and is sent to the eNB, so that the eNB establishes a third service tunnel between the eNB and the service offloading apparatus according to the IP address of the service offloading apparatus, where the third service tunnel is used for transmitting uplink service data and downlink service data for the user equipment. The technical solution of establishing the third service tunnel herein is applicable to a case where multiple eNBs share one service offloading apparatus.

For example, in a scenario where multiple eNBs share one service offloading apparatus, mobility of the user equipment may be supported. That is, when the eNB is served as a source eNB of the user equipment and the user equipment is handed over to a target eNB, the source eNB of the user equipment sends a handover request message to the target eNB. The handover request message carries the IP address of the service offloading apparatus, and tunnel identification information of the first service tunnel of the user equipment or tunnel identification information of the second service tunnel of the user equipment, so that the target eNB can establish a fourth service tunnel between the target eNB and the service offloading apparatus according to the IP address of the service offloading apparatus and instruct the service offloading apparatus to use the fourth service tunnel to transmit, for the user equipment, downlink service data received through the first service tunnel or the second service tunnel. The tunnel identification information may be a tunnel number or tunnel address information, for example, an IP address and a port number of the tunnel.

In the embodiment provided by the present invention, the eNB may optionally have a one-to-one relationship with the service offloading apparatus. That is, each eNB has a service offloading apparatus that separately serves the eNB. For example, a part of the eNB is used to implement functions of the service offloading apparatus, or in other words, the service offloading apparatus in the above embodiment may be allocated in the eNB as a part of the eNB. This technical solution can also support mobility. In this embodiment, after establishing the first service tunnel, the core network service proxy apparatus not only sends, to the service offloading apparatus, the IP address assigned to the user equipment, but also may send a tunnel number and tunnel address information of the first service tunnel. Meanwhile, after establishing the second service tunnel, the non-core network service proxy apparatus may also send a tunnel number and tunnel address information of the second service tunnel to the service offloading apparatus. The tunnel address information includes the IP address and the port number of the tunnel. At this time, if the user equipment is handed over from the source eNB to the target eNB, the method may include the following steps.

In one step, the method includes obtaining, by the source eNB, the IP address of the user equipment, the tunnel number and the tunnel address information of the first service tunnel, and the tunnel number and the tunnel address information of the second service tunnel. The source eNB obtains the information through interaction inside the device because the service offloading apparatus exists as a part of the eNB.

In another step, the method may further include sending, by the source eNB, the handover request message, which carries the IP address of the user equipment, the tunnel number and the tunnel address information of the first service tunnel, and the tunnel number and the tunnel address information of the second service tunnel, to the target eNB, and after the target eNB obtains the information from the handover request message, pushing, by the target eNB, the information to the service offloading apparatus of the target eNB.

In another step, the method may further include sending, by the service offloading apparatus of the target eNB, a tunnel reestablishment request, which carries the tunnel number of the first service tunnel, to the core network service proxy apparatus according to the tunnel address information of the first service tunnel, so that the core network service proxy apparatus reestablishes, for the user equipment, a fifth service tunnel between the core network service proxy apparatus and the service offloading apparatus of the target eNB. The fifth service tunnel is used for transmitting uplink and downlink service data for the user equipment that has completed the handover procedure. The method may also include sending, by the service offloading apparatus of the target evolved NodeB, a tunnel reestablishment request, which carries the tunnel number of the second service tunnel, to the non-core network service proxy apparatus according to the tunnel address information of the second service tunnel, so that the non-core network service proxy apparatus reestablishes, for the user equipment, a sixth service tunnel between the non-core network service proxy apparatus and the service offloading apparatus of the target eNB. The sixth service tunnel is used for transmitting uplink and downlink service data for the user equipment that has completed the handover procedure.

The technical solution provided by this embodiment can support the mobility of the user equipment.

Figure 3:
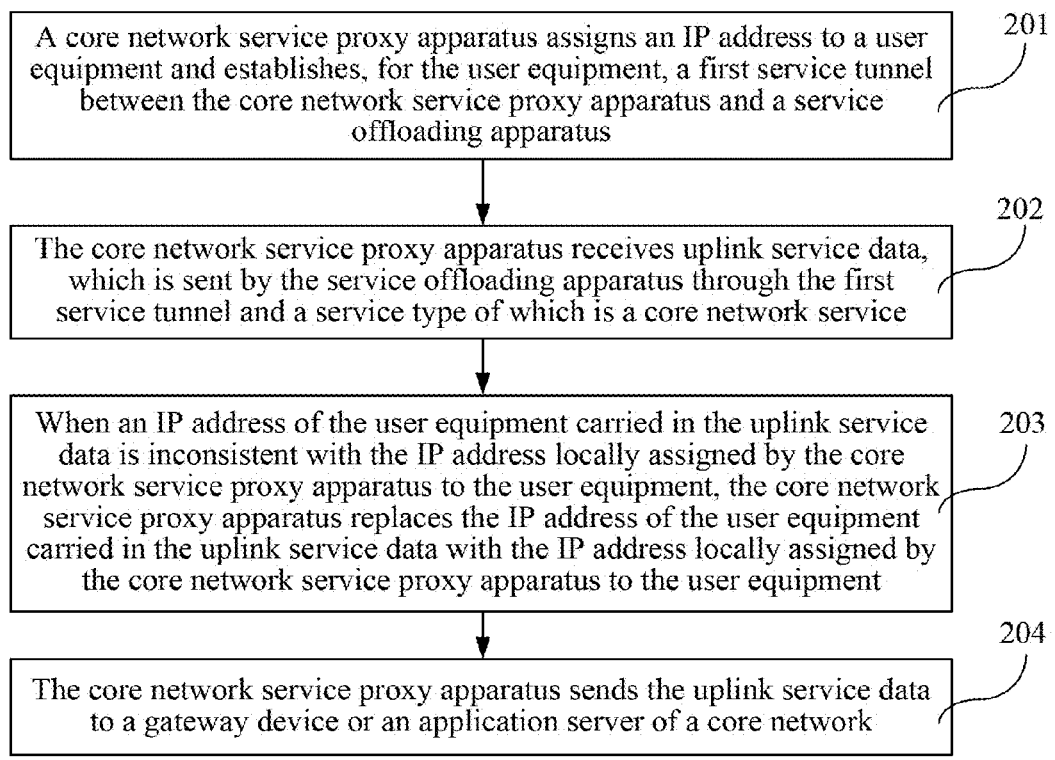
FIG. 3 is a schematic flow chart of an embodiment of a service data transmission processing method in another embodiment of the present invention.

An embodiment of the present invention further provides a data processing method with respect to a core network service proxy apparatus. FIG. 3 is a schematic flow chart of a service data transmission processing method in another embodiment of the present invention. As shown in FIG. 3, the following steps are included.

Step 201: A core network service proxy apparatus assigns an IP address to a user equipment and establishes, for the user equipment, a first service tunnel between the core network service proxy apparatus and a service offloading apparatus.

Step 202: The core network service proxy apparatus receives uplink service data, which is sent by the service offloading apparatus through the first service tunnel and a service type of which is a core network service.

Step 203: When an IP address of the user equipment carried in the uplink service data is inconsistent with the IP address locally assigned by the core network service proxy apparatus to the user equipment, the core network service proxy apparatus replaces the IP address of the user equipment carried in the uplink service data with the IP address locally assigned by the core network service proxy apparatus to the user equipment.

Step 204: The core network service proxy apparatus sends the uplink service data to a gateway device or an application server of a core network.

The above embodiment of the present invention provides a solution for a core network service processing apparatus to process uplink service data, a service type of which is a core network service. First, an IP address is assigned to a user equipment and a first service tunnel for transmitting service data is established for the user equipment. When uplink service data is received, whether an IP address of the user equipment carried in the uplink service data is locally assigned by the core network service proxy apparatus is determined; if not, the IP address of the user equipment carried in the uplink service data needs to be replaced with the IP address locally assigned by the core network service proxy apparatus to the user equipment. In the embodiments of the present invention, one example of a core network service processing apparatus is a core network service proxy apparatus.

The IP address locally assigned by the core network service proxy apparatus to the user equipment is identification information of the user equipment in the core network. Downlink service data received by the core network service processing apparatus also needs to be correspondingly processed. When an IP address of the user equipment is not an IP address assigned by the core network service processing apparatus to the user equipment, the IP address which is locally assigned to the user equipment and is carried in the downlink service data is replaced with the actual IP address of the user equipment.

In a specific embodiment, before step 201 is performed, the method further includes acquiring, by the core network service proxy apparatus, that the service offloading apparatus requests the assignment of the IP address to the user equipment and/or the establishment of the first service tunnel between the service offloading apparatus and the core network service proxy apparatus for the user equipment. As shown in the above embodiment, the acquiring the two requests by the core network service proxy apparatus may be initiated by the service offloading apparatus through one request message, or may be initiated by the service offloading apparatus through two different request messages.

Figure 4:
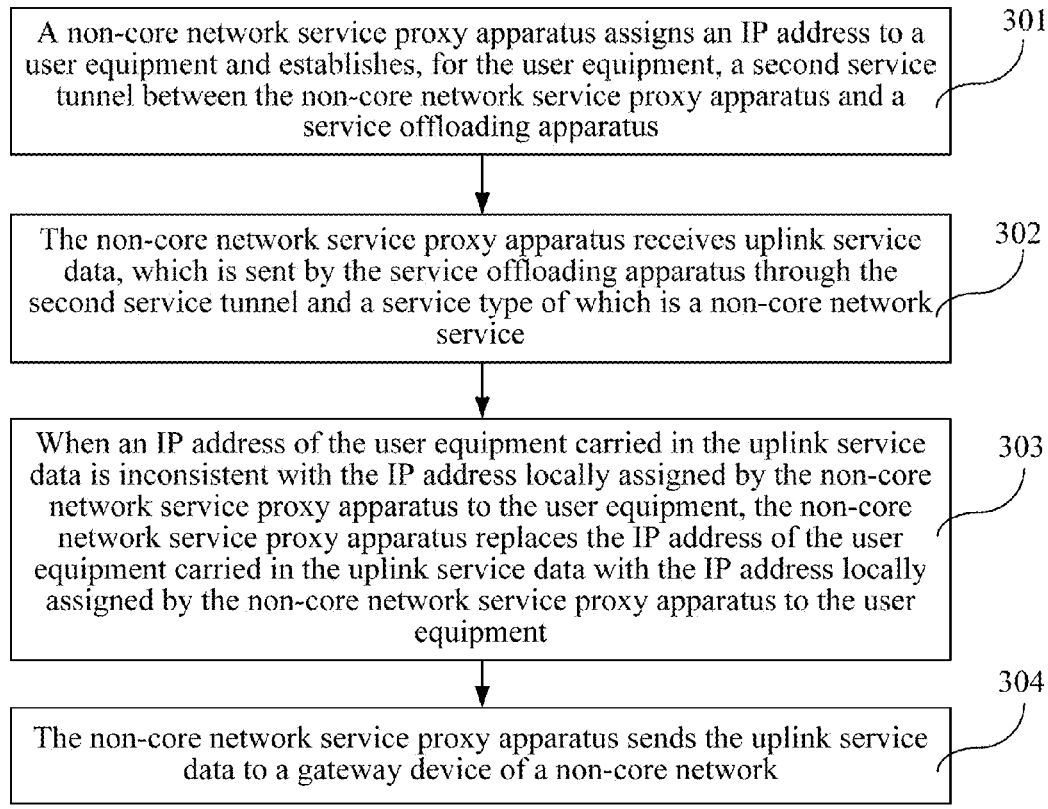
FIG. 4 is a schematic flow chart of an embodiment of a service data transmission processing method in still another embodiment of the present invention.

An embodiment of the present invention further provides a processing method with respect to a non-core network service proxy apparatus. FIG. 4 is a schematic flow chart of a service data transmission processing method in still another embodiment of the present invention. As shown in FIG. 4, the following steps are included.

Step 301: A non-core network service proxy apparatus assigns an IP address to a user equipment and establishes, for the user equipment, a second service tunnel between the non-core network service proxy apparatus and a service offloading apparatus.

Step 302: The non-core network service proxy apparatus receives uplink service data, which is sent by the service offloading apparatus through the second service tunnel and a service type of which is a non-core network service.

Step 303: When an IP address of the user equipment carried in the uplink service data is inconsistent with the IP address locally assigned by the non-core network service proxy apparatus to the user equipment, the non-core network service proxy apparatus replaces the IP address of the user equipment carried in the uplink service data with the IP address locally assigned by the non-core network service proxy apparatus to the user equipment.

Step 304: The non-core network service proxy apparatus sends the uplink service data to an application server of a non-core network.

Optionally, specifically, for external Internet services, the application server is an Internet application server, and for local network interactive services, the application server is a local application server.

The above embodiment of the present invention provides a solution for a non-core network service processing apparatus to process uplink service data, a service type of which is a non-core network service. First, an IP address is assigned to an user equipment and a second service tunnel for transmitting service data is established for the user equipment. When uplink service data is received, whether an IP address of the user equipment carried in the uplink service data is locally assigned by the non-core network service proxy apparatus is determined. If not, the IP address of the user equipment carried in the uplink service data needs to be replaced with the IP address locally assigned by the non-core network service proxy apparatus to the user equipment. In the embodiments of the present invention, one example of a non-core network service processing apparatus is a non-core network service proxy apparatus.

The IP address locally assigned by the non-core network service proxy apparatus to the user equipment is identification information of the user equipment in the non-core network. Downlink service data received by the non-core network service processing apparatus also needs to be correspondingly processed. When an IP address of the user equipment is not an IP address assigned by the non-core network service processing apparatus to the user equipment, the IP address which is locally assigned to the user equipment and is carried in the downlink service data is replaced with the actual IP address of the user equipment.

In a specific embodiment, before step 301 is performed, the method further includes acquiring, by the non-core network service proxy apparatus, that the service offloading apparatus requests the assignment of the IP address to the user equipment and/or the establishment of the second service tunnel between the service offloading apparatus and the non-core network service proxy apparatus. As shown in the above embodiment, the acquiring the two requests by the non-core network service proxy apparatus may be initiated by the service offloading apparatus through one request message, or may be initiated by the service offloading apparatus through two different request messages.

Figure 5:
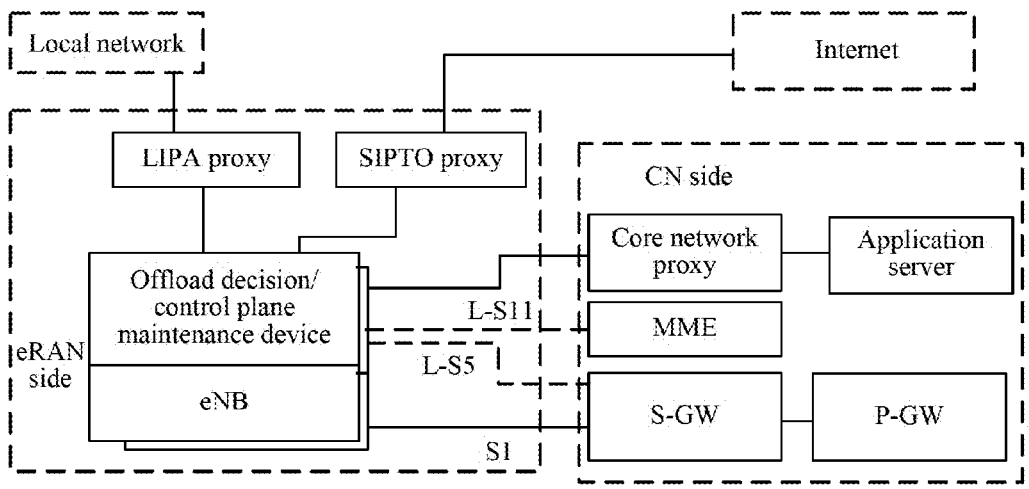
FIG. 5 is a network architecture diagram of a single-APN service mode in an embodiment of the present invention.
Figure 6:
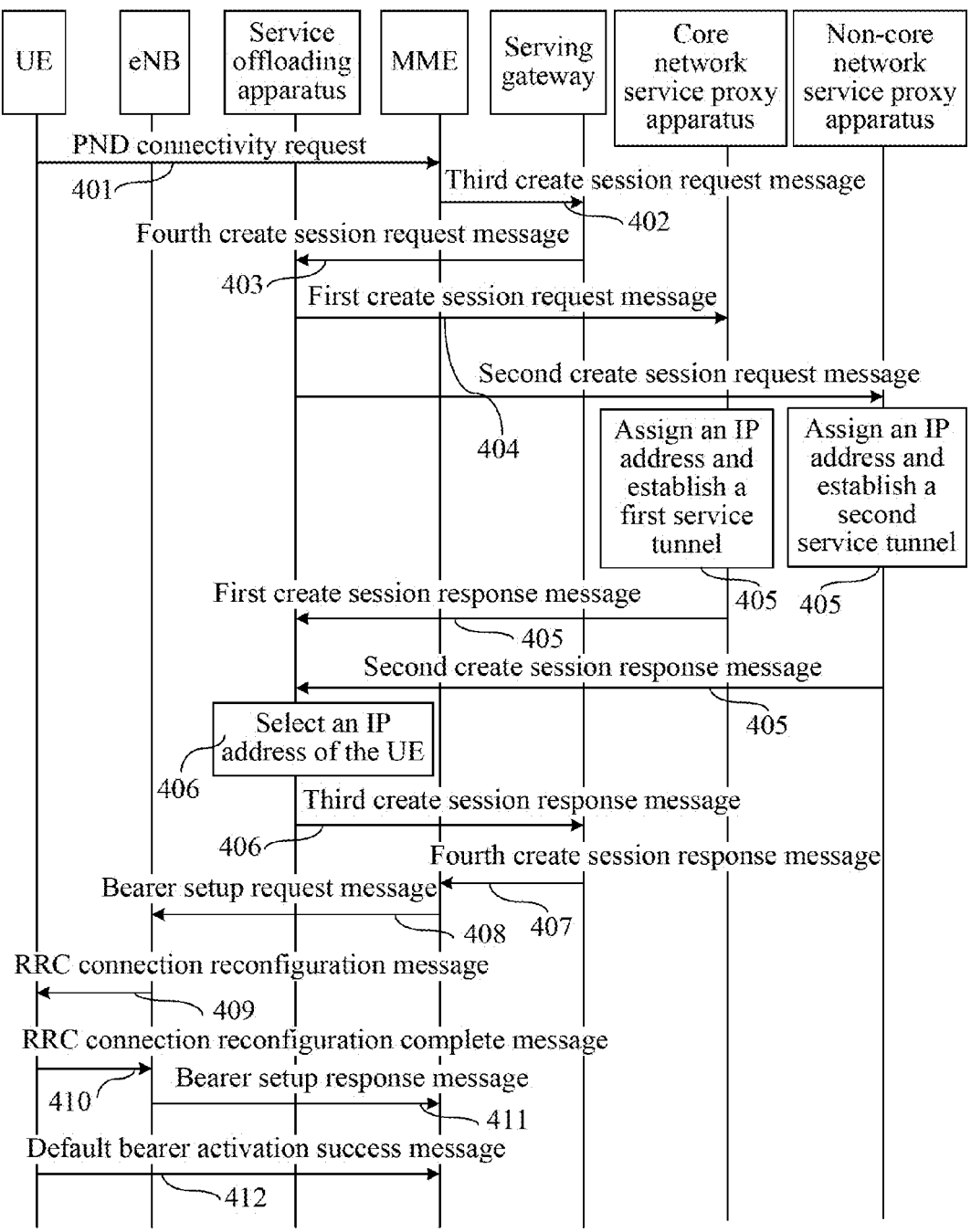
FIG. 6 is a schematic flow chart of a specific embodiment of the present invention.

The present invention provides an embodiment for a single-APN service mode, and for the network architecture thereof, reference may be made to FIG. 5. In this embodiment, when an eNB is initially powered up or forwards a NAS message, the eNB notifies an IP address of a service offloading apparatus to an MME. The service offloading apparatus mainly functions to decide routing and may be referred to as an offload decision/control plane maintenance device. The service offloading apparatus distinguishes different service flows and supports distinguishment of various forms, such as APN, deep packet inspection (DPI) and quality of service (Qos) class identifier (QCI). Referring to FIG. 6, the following steps are included.

Step 401: A user equipment (UE) initiates a PDN connectivity request to an MME, where the PDN connectivity request is transparently transmitted to the MME through an eNB where the UE resides.

Step 402: After receiving the PDN connectivity request sent by the UE, the MME may determine, according to the capability of the eNB where the UE resides, an APN attribute, or other decision conditions, whether the eNB supports service flow offloading, where the capability of the eNB may be notified to the MME by the eNB when the eNB is initially powered up, and if the eNB does not support service flow offloading, the MME establishes a connection to a P-GW according to a process in the prior art; if the eNB supports service flow offloading, the MME obtains an IP address of a service offloading apparatus, and carries the IP address of the service offloading apparatus in a third create session request message (Create Session Request) sent to an S-GW. In this embodiment, it is assumed that the eNB supports service flow offloading.

Step 403: After receiving the third create session request message, the S-GW sends a fourth create session request message to the service offloading apparatus, where the fourth create session request message is used for requesting establishment of a transmission channel for service transmission for the user equipment and assignment of an IP address to the user equipment. Specifically, for the fourth create session request message, reference may be made to the example of implementing the first instruction and the second instruction towards the service offloading apparatus through one message in the above embodiment.

Step 404: After receiving the fourth create session request message, the service offloading apparatus sends a first create session request message to a core network service proxy apparatus, where the first create session request message is used for requesting the core network service proxy apparatus to establish a first service tunnel between the service offloading apparatus and the core network service proxy apparatus for the UE initiating the request and requesting the core network service proxy apparatus to assign an IP address to the UE initiating the request.

Optionally, the service offloading apparatus further sends a second create session request message to a non-core network service proxy apparatus, where the second create session request message is used for requesting the non-core network service proxy apparatus to establish a second service tunnel between the service offloading apparatus and the non-core network service proxy apparatus for the UE initiating the request and requesting the non-core network service proxy apparatus to assign an IP address to the UE initiating the request. Specifically, the non-core network service proxy apparatus may include the traffic offloading proxy apparatus (SIPTO) and local IP address access proxy apparatus (LIPA) that are mentioned before. The traffic offloading proxy apparatus (SIPTO) is responsible for processing the service flow sent to an external Internet, and the local IP address access proxy apparatus (LIPA) is responsible for processing the service flow sent to a local area network.

Step 405: After receiving the first create session request message, the core network service proxy apparatus may assign an IP address to the user equipment and establish, for the user equipment, a first service tunnel for transmitting uplink and downlink service data between the core network service proxy apparatus and the service offloading apparatus; and in addition, the core network service proxy apparatus notifies the IP address, which is assigned to the UE, to the service offloading apparatus by sending a first create session response message (Create Session Response), which carries the IP address assigned to the UE, to the service offloading apparatus.

Optionally, if the non-core network service proxy apparatus receives the second create session request message, the non-core network service proxy apparatus assigns an IP address to the user equipment and establishes, for the user equipment, a second service tunnel for transmitting uplink and downlink service data between the non-core network service proxy apparatus and the service offloading apparatus; and further, the non-core network service proxy apparatus notifies the IP address, which is assigned to the UE, to the service offloading apparatus by sending a second create session response message (Create Session Response), which carries the IP address assigned to the UE, to the service offloading apparatus.

Step 406: After receiving the first create session response message and the second create session response message, the service offloading apparatus selects one of the IP addresses assigned to the user equipment as an IP address of the UE, and carries the selected IP address of the UE in a third create session response message and returns it to an S-GW, where the message notifies the S-GW that a service data transmission tunnel between the service offloading apparatus and the service proxy apparatus is successfully established.

Step 407: The S-GW sends a fourth create session response message (Create Session Response), which carries the IP address of the UE, to an MME, where the message is used for notifying the MME that a network side connection is established.

Step 408: The MME sends a bearer setup request message (Bearer Setup Request) to the eNB, to instruct the eNB to establish a default bearer, that is, to establish a service tunnel for transmitting uplink and downlink service data for the UE, where the request message carries an IP address of the service offloading apparatus, an IP address of the S-GW, and a non-access stratum (Non-Access Stratum, NAS) message, the eNB does not parse the NAS message, but directly forwards the NAS message to the UE, and in this embodiment, the IP address of the UE is carried in the NAS message, so as to be transferred to the UE.

Step 409: After receiving the bearer setup request message, the eNB establishes a third service tunnel between the eNB and the service offloading apparatus according to the IP address of the service offloading apparatus, where the third service tunnel is used for transmitting uplink and downlink service data for the user equipment, and the eNB sends an RRC connection reconfiguration message (RRC Connection Reconfiguration) to the UE through an air interface, where the reconfiguration message carries the NAS message, and the NAS message further carries the IP address of the UE.

Step 410: The UE sends an RRC connection reconfiguration complete message (RRC Connection Reconfiguration Complete) to the eNB.

Step 411: The eNB sends a bearer setup response message (Bearer Setup Response) to the MME.

Step 412: The UE sends a default bearer activation success message (Activate Default EPS Bearer Context Accept) to the MME through the NAS message, so as to complete establishment of a PDN connection, that is, a channel for service transmission between the UE and the service proxy apparatus is established, and the UE can perform uplink and downlink service data transmission through the core network service proxy apparatus or the non-core network service proxy apparatus.

In addition, in steps 404 and 405 of the present invention, it is possible that only the core network service proxy apparatus assigns an IP address and the non-core network service proxy apparatus does not assign an IP address, so only the create session response message returned by the core network service proxy apparatus caries the IP address. Therefore, selection does not need to be performed in step 406, and the IP address is directly determined as the IP address of the UE.

In addition, the above technical solution aims at a case where one service offloading apparatus serves multiple eNBs. In step 408, the bearer setup request message sent by the MME to the eNB carries the IP address of a service offloading apparatus, and in step 409, the third service tunnel between the eNB and the service offloading apparatus is established. For a technical solution where the service offloading apparatus is served as a part of the eNB, the bearer setup request message does not need to carry the IP address of the service offloading apparatus, and establishment of the third service tunnel in step 409 is not needed.

Figure 7:
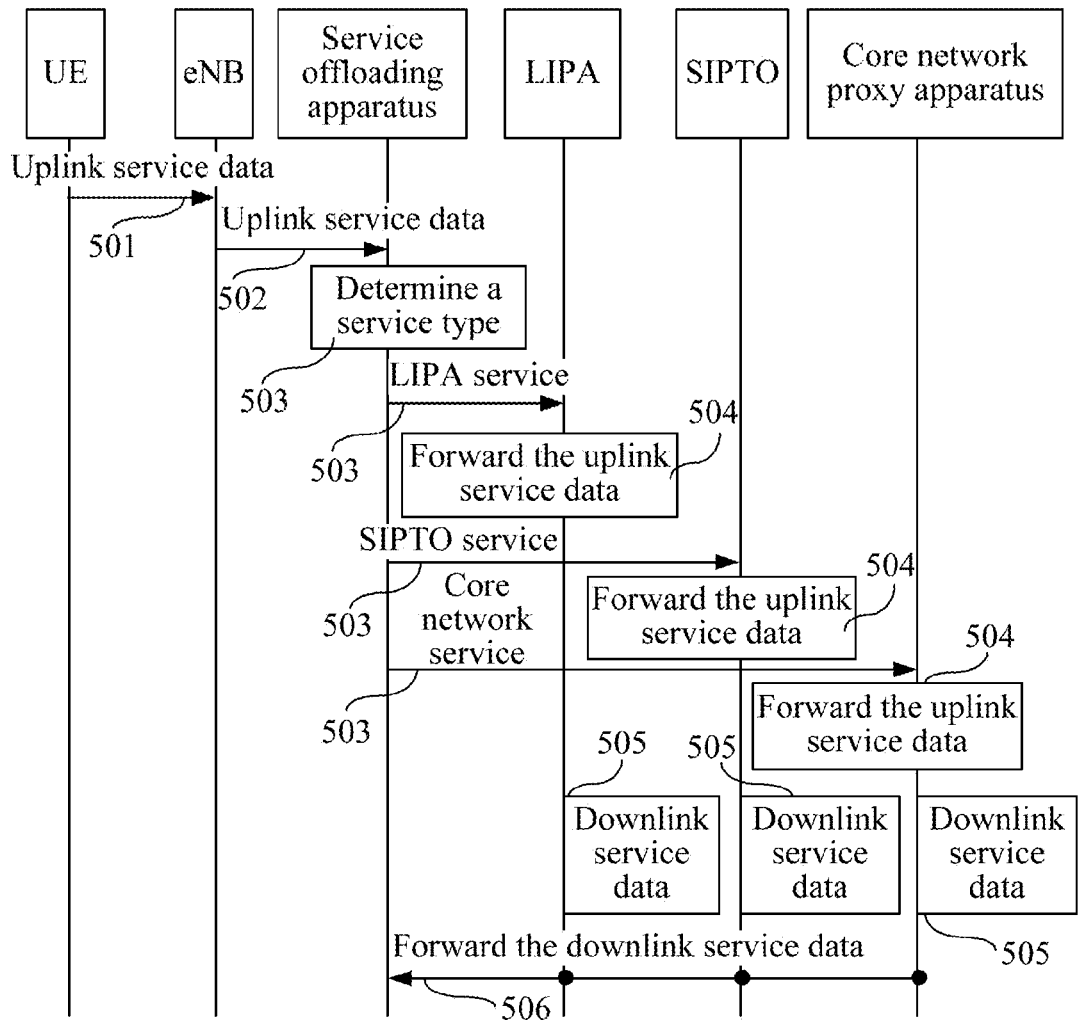
FIG. 7 is a schematic flow chart of another specific embodiment of the present invention.

Service processing may be performed after the PDN connection is established. Specifically, the service flow of a single-APN mode may be processed as shown in FIG. 7, and the following steps are included.

Step 501: A UE sends uplink service data to an eNB, where the uplink service data carries an IP address of the user equipment, and meanwhile, a service type of the uplink service data may be a core network service or a non-core network service.

Step 502: The eNB forwards the uplink service data to a service offloading apparatus. Specifically, when a third service tunnel is established between the service offloading apparatus and the eNB, the uplink service data is forwarded to the service offloading apparatus through the third tunnel, and when the service offloading apparatus is a part of the eNB, the process of forwarding the uplink service data through the third service tunnel is unnecessary.

Step 503: The service offloading apparatus analyzes the received uplink service data, determines the service type of the uplink service data, and sends the uplink service data to different service proxy apparatuses according to different service types. For uplink service data, a service type of which is a core network service, the service offloading apparatus sends the uplink service data to a core network service proxy apparatus through a first service tunnel. As described in the above embodiment, non-core network services include external Internet services and local network interactive services. In this step, uplink service data interacting with an external Internet (also referred to as an SIPTO service) is sent to a traffic offloading proxy apparatus (SIPTO), and uplink service data interacting with a local network (also referred to as an LIPA service) is sent to a local IP address access proxy apparatus (LIPA).

Step 504: Each service proxy apparatus forwards the uplink service data.

In this step, for both the core network service proxy apparatus and the non-core network service proxy apparatus, when a case where IP addresses are inconsistent occurs, network address translation (NAT) is performed, to replace the IP carried in the uplink service data with the IP address locally assigned to the UE, and then the uplink service data is sent to a corresponding network.

The steps are the specific embodiment for the uplink service data. For downlink service data, the following steps may further be included.

Step 505: After the core network service proxy apparatus or the non-core network service proxy apparatus receives downlink service data sent by an external network to the user equipment, when the IP address of the user equipment is not an IP address locally assigned to the user equipment, the core network service proxy apparatus or the non-core network service proxy apparatus replaces the IP address, which is locally assigned to the user equipment and is carried in the downlink service data, with the actual IP address of the user equipment.

Step 506: Each service proxy apparatus forwards the downlink service data to the service offloading apparatus. Specifically, the core network service proxy apparatus sends the downlink service data to the service offloading apparatus through a first service tunnel, and the non-core network service proxy apparatus sends the downlink service data to the service offloading apparatus through a second service tunnel.

Figure 8:
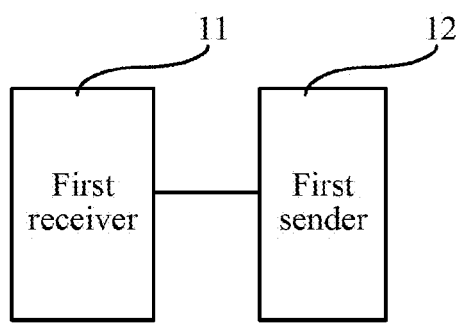
FIG. 8 is a schematic structural diagram of a service offloading apparatus in an embodiment of the present invention.

An embodiment of the present invention further provides a service offloading apparatus, which can be used for performing actions performed by the service offloading apparatus in the method provided by the above embodiment. FIG. 8 is a schematic structural diagram of a service offloading apparatus in an embodiment of the present invention. As shown in FIG. 8, the apparatus may include a first receiver 11 and a first sender 12. The first receiver 11 is configured to receive uplink service data sent by a user equipment and obtain a service type of the uplink service data. The first sender 12 is configured to send uplink service data, a service type of which is a core network service, to a core network service proxy apparatus through a first service tunnel, or is configured to send uplink service data, a service type of which is a non-core network service, to a non-core network service proxy apparatus through a second service tunnel.

In the above embodiment of the present invention, a service offloading apparatus and a service proxy apparatus are separately provided as two parts of a local gateway, where the service proxy apparatus may further be divided into a core network service proxy apparatus and a non-core network service proxy apparatus, which facilitates arrangement of the position of the service proxy apparatus according to an actual requirement. Besides, when a non-core network service is performed, the service flow of the non-core network service is identified in the service offloading apparatus, and is directly sent to the corresponding non-core network service proxy apparatus, thereby avoiding excessive use of backhaul network resources of a core network by non-core network services and saving the backhaul network resources.

Optionally, the first receiver 11 in this embodiment is further configured to obtain a first instruction from an S-GW, where the first instruction is used for requesting assignment of an IP address to the user equipment and/or establishment of a first service tunnel between the service offloading apparatus and the core network service proxy apparatus for the user equipment. The first sender 12 is further configured to, after the first receiver obtains the first instruction, request the core network service proxy apparatus to assign the IP address to the user equipment. The first receiver 11 is further configured to receive the IP address which is sent by the core network service proxy apparatus and is assigned to the user equipment. Through the above technical solution, an IP address may be assigned to the user equipment, and a trigger mechanism may further be set for the core network service proxy apparatus, so that the core network service proxy apparatus may automatically trigger the establishment of the first service tunnel between the core network service proxy apparatus and the service offloading apparatus for the user equipment each time after assigning the IP address to the user equipment. By requesting the core network service proxy apparatus to assign an IP address to the user equipment, the IP address is assigned and the first service tunnel is established.

If the trigger mechanism is not set for the core network service proxy apparatus, the first sender 12 is further configured to, after the first receiver 11 obtains the first instruction, request the core network service proxy apparatus to establish, for the user equipment, the first service tunnel between the service offloading apparatus and the core network service proxy apparatus, so that the core network service proxy apparatus establishes the first service tunnel according to the instruction.

Optionally, the first receiver 11 in the above embodiment is further configured to obtain a second instruction from the S-GW, where the second instruction is used for requesting assignment of an IP address to the user equipment and/or establishment of a second service tunnel between the service offloading apparatus and the non-core network service proxy apparatus for the user equipment. The first sender 12 is further configured to, after the first receiver 11 obtains the second instruction, request the non-core network service proxy apparatus to assign the IP address to the user equipment. The first receiver 11 is further configured to receive the IP address which is sent by the non-core network service proxy apparatus and is assigned to the user equipment. Through the above technical solution, an IP address may be assigned to the user equipment, and a trigger mechanism may further be set for the non-core network service proxy apparatus, so that the non-core network service proxy apparatus may automatically trigger the establishment of the second service tunnel between the non-core network service proxy apparatus and the service offloading apparatus for the user equipment each time after assigning the IP address to the user equipment. By requesting the non-core network service proxy apparatus to assign an IP address to the user equipment, the IP address is assigned and the second service tunnel is established.

If the trigger mechanism is not set for the non-core network service proxy apparatus, the first sender 12 is further configured to, after the first receiver 11 obtains the second instruction, request the non-core network service proxy apparatus to establish, for the user equipment, the second service tunnel between the service offloading apparatus and the non-core network service proxy apparatus, so that the non-core network service proxy apparatus establishes the second service tunnel according to the instruction.

The functions of the service offloading apparatus in the embodiment of the present invention may be implemented by a part of an eNB, that is, the service offloading apparatus in the above embodiment is an eNB.

Figure 9:
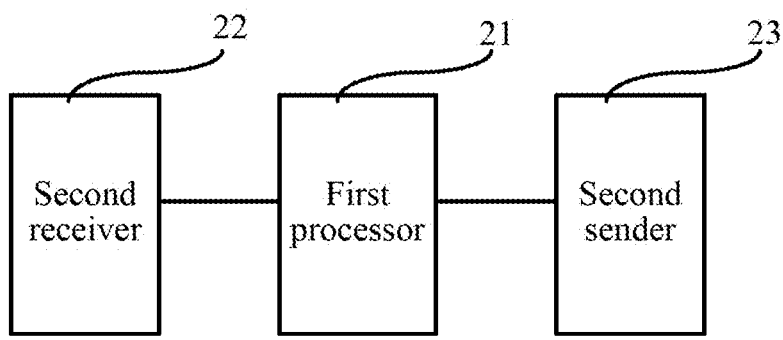
FIG. 9 is a schematic structural diagram of a core network service proxy apparatus in an embodiment of the present invention.

An embodiment of the present invention further provides a core network service proxy apparatus, which can be used for implementing actions performed by the core network service proxy apparatus in the method provided by the above embodiment. FIG. 9 is a schematic structural diagram of a core network service proxy apparatus in an embodiment of the present invention. As shown in FIG. 9, the core network service proxy apparatus may include a first processor 21, a second receiver 22 and a second sender 23. The first processor 21 is configured to assign an IP address to a user equipment and establish, for the user equipment, a first service tunnel between the core network service proxy apparatus and a service offloading apparatus. The second receiver 22 is configured to receive uplink service data, which is sent by the service offloading apparatus through the first service tunnel and a service type of which is a core network service. The first processor 21 is further configured to, when an IP address of the user equipment carried in the uplink service data is inconsistent with the IP address assigned by the first processor to the user equipment, replace the IP address of the user equipment carried in the uplink service data with the IP address assigned by the first processor to the user equipment. The second sender 23 is configured to send the uplink service data to a gateway device or an application server of a core network.

The core network service processing apparatus provided by this embodiment can establish the first service tunnel between the core network service proxy apparatus and the service offloading apparatus, and in the process of transmitting service data, it can process the uplink service data, the service type of which is a core network service, and can perform IP address translation.

In addition, the assignment of the IP address and the establishment of the first service tunnel by the core network service proxy apparatus need to be triggered by the request of the service offloading apparatus. That is, the second receiver 22 is further configured to acquire that the service offloading apparatus requests the assignment of the IP address to the user equipment and/or the establishment of the first service tunnel between the service offloading apparatus and the core network service proxy apparatus for the user equipment.

Figure 10:
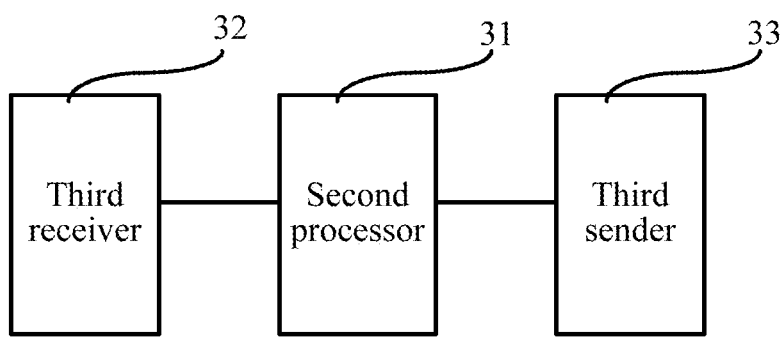
FIG. 10 is a schematic structural diagram of a non-core network service proxy apparatus in an embodiment of the present invention.

An embodiment of the present invention further provides a non-core network service proxy apparatus, which can be used for implementing actions performed by the non-core network service proxy apparatus in the method provided by the above embodiment. FIG. 10 is a schematic structural diagram of a non-core network service proxy apparatus in an embodiment of the present invention. As shown in FIG. 10, the non-core network service proxy apparatus includes a second processor 31, a third receiver 32 and a third sender 33. The second processor 31 is configured to assign an IP address to a user equipment and establish, for the user equipment, a second service tunnel between the non-core network service proxy apparatus and a service offloading apparatus. The third receiver 32 is configured to receive uplink service data, which is sent by the service offloading apparatus through the second service tunnel and a service type of which is a non-core network service. The second processor 31 is further configured to, when an IP address of the user equipment carried in the uplink service data is inconsistent with the IP address assigned by the second processor 31 to the user equipment, replace the IP address of the user equipment carried in the uplink service data with the IP address assigned by the second processor 31 to the user equipment. The third sender 33 is configured to send the uplink service data to a gateway device of a non-core network.

The non-core network service processing apparatus provided by this embodiment can establish the second service tunnel between the non-core network service proxy apparatus and the service offloading apparatus, and in the process of transmitting service data, it can process the uplink service data, the service type of which is a non-core network service, and can perform IP address translation.

In addition, the assignment of the IP address and the establishment of the second service tunnel by the non-core network service proxy apparatus need to be triggered by the request of the service offloading apparatus. That is, the third receiver 32 is further configured to acquire that the service offloading apparatus requests the assignment of the IP address to the user equipment and/or the establishment of the second service tunnel between the service offloading apparatus and the non-core network service proxy apparatus for the user equipment.

An embodiment of the present invention further provides a communication system. The communication system includes a service proxy apparatus and the service offloading apparatus provide by the above embodiment, where the service proxy apparatus includes the core network service proxy apparatus and the non-core network service proxy apparatus provided by the above embodiment. For example, the communication system includes the service offloading apparatus, and further includes at least one of the core network service proxy apparatus and the non-core network service proxy apparatus. The service offloading apparatus is configured to receive uplink service data sent by a user equipment and obtain a service type of the uplink service data, and is configured to send uplink service data, a service type of which is a core network service, to the core network service proxy apparatus through a first service tunnel or send uplink service data, a service type of which is a non-core network service, to the non-core network service proxy apparatus through a second service tunnel.

A person of ordinary skill in the art may understand that all or part of the steps of the methods in the embodiments may be implemented by a program instructing relevant hardware. The program may be stored in a computer readable storage medium. When the program is run, the above steps of the methods in the embodiments are performed. The storage medium may be any medium capable of storing program codes, such as a ROM, a RAM, a magnetic disk, or an optical disk.

Finally, it should be noted that the above embodiments are merely intended for describing the technical solutions of the present invention other than limiting the present invention. Although the present invention is described in detail with reference to the foregoing embodiments, persons of ordinary skill in the art should understood that they may still make modifications to the technical solutions described in the foregoing embodiments, or make equivalent replacements to some technical features thereof, as long as such modifications or replacements do not cause the essence of corresponding technical solutions to depart from the scope of the technical solutions of the embodiments of the present invention.

What is claimed is:

1. A service data transmission processing method comprising:
    when a service offloading apparatus obtains a second instruction from a serving gateway, requesting, by the service offloading apparatus, a non-core network service proxy apparatus to assign an IP address to a user equipment, wherein the second instruction is used for requesting the assigning of the IP address to the user equipment and/or establishment of a second service tunnel between the service offloading apparatus and the non-core network service proxy apparatus for the user equipment;
    receiving, by the service offloading apparatus, the IP address which is sent by the non-core network service proxy apparatus and is assigned to the user equipment;
    sending the IP address to the user equipment;
    receiving, by the service offloading apparatus, uplink service data sent by the user equipment;
    obtaining, by the service offloading apparatus, a service type of the uplink service data;
    determining whether the service type of the uplink service data obtained by the service offloading apparatus is a core network service or a non-core network service;
    if the service type of the uplink service data obtained by the service offloading apparatus is a core network service, sending, by the service offloading apparatus, the uplink service data to a core network service proxy apparatus through a first service tunnel; and
    if the service type of the uplink service data obtained by the service offloading apparatus is a non-core network service, sending, by the service offloading apparatus, the uplink service data to a non-core network service proxy apparatus through the second service tunnel.

2. The service data transmission processing method according to claim 1, wherein
the non-core network service is an external Internet service, and the non-core network service proxy apparatus is a traffic offloading proxy apparatus; or
the non-core network service is a local network interactive service, and the non-core network service proxy apparatus is a local IP address access proxy apparatus.

3. The service data transmission processing method according to claim 1, wherein before the receiving, by the service offloading apparatus, the IP address which is sent by the non-core network service proxy apparatus and is assigned to the user equipment, the method further comprises:
requesting, by the service offloading apparatus, the non-core network service proxy apparatus to establish, for the user equipment, the second service tunnel between the service offloading apparatus and the non-core network service proxy apparatus.

4. The service data transmission processing method according to claim 3, wherein the service offloading apparatus requests the non-core network service proxy apparatus to assign the IP address to the user equipment and/or to establish, for the user equipment, the second service tunnel between the service offloading apparatus and the non-core network service proxy apparatus by sending a second create session request message to the non-core network service proxy apparatus.

5. A service data transmission processing method comprising:
when a service offloading apparatus obtains a first instruction from a serving gateway, requesting, by the service offloading apparatus, a core network service proxy apparatus to assign an IP address to a user equipment, wherein the first instruction is used for requesting the assignment of the IP address to the user equipment and/or establishment of a first service tunnel between the service offloading apparatus and the core network service proxy apparatus for the user equipment;
receiving, by the service offloading apparatus, the IP address which is sent by the core network service proxy apparatus and is assigned to the user equipment;
receiving, by the service offloading apparatus, uplink service data sent by the user equipment;
obtaining, by the service offloading apparatus, a service type of the uplink service data;
determining whether the service type of the uplink service data obtained by the service offloading apparatus is a core network service or a non-core network service;
if the service type of the uplink service data obtained by the service offloading apparatus is a core network service, sending, by the service offloading apparatus, the uplink service data to a core network service proxy apparatus through the first service tunnel; and
if the service type of the uplink service data obtained by the service offloading apparatus is a non-core network service, sending, by the service offloading apparatus, the uplink service data to a non-core network service proxy apparatus through a second service tunnel.

6. The service data transmission processing method according to claim 5, wherein before the receiving, by the service offloading apparatus, the IP address which is sent by the core network service proxy apparatus and is assigned to the user equipment, the method further comprises:
requesting, by the service offloading apparatus, the core network service proxy apparatus to establish, for the user equipment, the first service tunnel between the service offloading apparatus and the core network service proxy apparatus.

7. The service data transmission processing method according to claim 6, wherein the service offloading apparatus requests the core network service proxy apparatus to assign the IP address to the user equipment and/or to establish, for the user equipment, the first service tunnel between the service offloading apparatus and the core network service proxy apparatus by sending a first create session request message to the core network service proxy apparatus.

8. The service data transmission processing method according to claim 5, wherein if the service offloading apparatus receives more than one IP address assigned to the user equipment, the method further comprises:
selecting, by the service offloading apparatus, an IP address of the user equipment from the more than one received IP address assigned to the user equipment as the IP address of the user equipment.

9. The service data transmission processing method according to claim 8, wherein if the IP address, which is sent by the core network service proxy apparatus and is assigned to the user equipment, exists in the more than one IP address which is assigned to the user equipment and is received by the service offloading apparatus, the service offloading apparatus selects the IP address which is sent by the core network service proxy apparatus and is assigned to the user equipment as the IP address of the user equipment.

10. The service data transmission processing method according to claim 8, wherein after the selecting, by the service offloading apparatus, the IP address of the user equipment from the more than one received IP address assigned to the user equipment, the method further comprises:
sending, by the service offloading apparatus, the IP address of the user equipment to the user equipment.

11. The service data transmission processing method according to claim 10, wherein the sending, by the service offloading apparatus, the IP address of the user equipment to the user equipment is specifically:
sending, by the service offloading apparatus, the IP address of the user equipment to an evolved NodeB, and sending, by the evolved NodeB, the IP address of the user equipment to the user equipment.

12. The service data transmission processing method according to claim 11, wherein the service offloading apparatus sends the IP address of the user equipment to the evolved NodeB through the serving gateway and a mobility management entity.

13. The service data transmission processing method according to claim 12, wherein the IP address of the user equipment sent to the evolved NodeB is carried in a bearer setup request message sent by the mobility management entity, and the bearer setup request message further carries an IP address of the service offloading apparatus, and the method further comprises:
establishing, by the evolved NodeB, a third service tunnel between the evolved NodeB and the service offloading apparatus according to the IP address of the service offloading apparatus, wherein the third service tunnel is used for transmitting uplink service data and/or downlink service data for the user equipment.

14. The service data transmission processing method according to claim 13, wherein the evolved NodeB is served as a source evolved NodeB of the user equipment, and the method further comprises:

sending, by the source evolved NodeB of the user equipment, a handover request message to a target evolved NodeB of the user equipment, so that the target evolved NodeB establishes a fourth service tunnel between the target evolved NodeB and the service offloading apparatus according to the IP address of the service offloading apparatus and instructs the service offloading apparatus to use the fourth service tunnel to transmit, for the user equipment, downlink service data received through the first service tunnel or the second service tunnel, wherein the handover request message carries the IP address of the service offloading apparatus, and tunnel identification information of the first service tunnel of the user equipment or tunnel identification information of the second service tunnel of the user equipment.

15. The service data transmission processing method according to claim 10, wherein the core network service proxy apparatus sends the IP address assigned to the user equipment and a tunnel number and a tunnel address information of the first service tunnel to the service offloading apparatus after establishing the first service tunnel, the non-core network service proxy apparatus sends the IP address assigned to the user equipment and a tunnel number and tunnel address information of the second service tunnel to the service offloading apparatus after establishing the second service tunnel, and if an evolved NodeB is used as a source evolved NodeB of the user equipment, the method further comprises:

obtaining, by the source evolved NodeB, the IP address of the user equipment, the tunnel number and the tunnel address information of the first service tunnel, and the tunnel number and the tunnel address information of the second service tunnel; and sending, by the source evolved NodeB, a handover request message, which carries the IP address of the user equipment, the tunnel number and the tunnel address information of the first service tunnel, and the tunnel number and the tunnel address information of the second service tunnel, to a target evolved NodeB, so that a service offloading apparatus of the target evolved NodeB establishes, for the user equipment, a fifth service tunnel between the service offloading apparatus of the target evolved NodeB and the core network service proxy apparatus and/or a sixth service tunnel between the service offloading apparatus of the target evolved NodeB and the non-core network service proxy apparatus.

16. A device, comprising:

a processor; and a non-transitory computer-readable storage medium storing a program to be executed by the processor, the program including instructions for:

when the device obtains a first instruction from a serving gateway, requesting a core network service proxy apparatus to assign an IP address to a user equipment, wherein the first instruction is used for requesting the assignment of the IP address to the user equipment and/or establishment of a first service tunnel between the device and the core network service proxy apparatus for the user equipment; and receiving the IP address which is sent by the core network service proxy apparatus and is assigned to the user equipment;

sending the IP address to the user equipment;

receiving uplink service data sent by the user equipment;

obtaining a service type of the uplink service data;

determining whether the service type of the uplink service data is a core network service or a non-core network service;

if the service type of the uplink service data is a core network service, sending the uplink service data to a core network service proxy apparatus through the first service tunnel; and if the service type of the uplink service data is a non-core network service, sending the uplink service data to a non-core network service proxy apparatus through a second service tunnel.

17. The device according to claim 16, wherein the program further includes instructions for:

when the device receives more than one IP address assigned to the user equipment, selecting an IP address of the user equipment from the more than one received IP address assigned to the user equipment as the IP address of the user equipment.

18. The device according to claim 17, wherein the program further includes instructions for:

after the selecting the IP address of the user equipment from the more than one received IP address assigned to the user equipment, sending the IP address of the user equipment to the user equipment.

* * * * *